(12) United States Patent
Higgins

(10) Patent No.: US 11,761,745 B2
(45) Date of Patent: Sep. 19, 2023

(54) MEASURING TAPE WITH IMPROVED ROLL-OVER PREVENTION AND STANDOUT

(71) Applicant: Apex Brands, Inc., Apex, NC (US)

(72) Inventor: Jeromy Elwood Higgins, Apex, NC (US)

(73) Assignee: Apex Brands, Inc., Apex, NC (US)

(*) Notice: Subject to any disclaimer, the term of this patent is extended or adjusted under 35 U.S.C. 154(b) by 0 days.

(21) Appl. No.: 18/019,936

(22) PCT Filed: Aug. 12, 2021

(86) PCT No.: PCT/US2021/045711
§ 371 (c)(1),
(2) Date: Feb. 6, 2023

(87) PCT Pub. No.: WO2022/036073
PCT Pub. Date: Feb. 17, 2022

(65) Prior Publication Data
US 2023/0213322 A1 Jul. 6, 2023

Related U.S. Application Data

(60) Provisional application No. 63/065,729, filed on Aug. 14, 2020.

(51) Int. Cl.
*G01B 3/1007* (2020.01)
*G01B 3/1003* (2020.01)

(52) U.S. Cl.
CPC ......... *G01B 3/1007* (2020.01); *G01B 3/1003* (2020.01)

(58) Field of Classification Search
CPC .......................... G01B 3/1007; G01B 3/1003
See application file for complete search history.

(56) References Cited

U.S. PATENT DOCUMENTS

| | | | |
|---|---|---|---|
| 6,499,226 B1 * | 12/2002 | Reda | G01B 3/1003 33/771 |
| 10,126,107 B2 * | 11/2018 | Khangar | G01B 3/1056 |
| 10,408,595 B2 * | 9/2019 | Moreau | A45F 5/021 |
| 11,199,390 B2 * | 12/2021 | Khangar | G01B 3/1003 |

(Continued)

FOREIGN PATENT DOCUMENTS

| | | | |
|---|---|---|---|
| CN | 116018495 A * | 4/2023 | |
| WO | 2018048810 A1 | 3/2018 | |
| WO | WO-2022036073 A1 * | 2/2022 | |

OTHER PUBLICATIONS

International Search Report and Written Opinion from International Application No. PCT/US2021/045711 dated Nov. 30, 2021, all enclosed pages cited.

*Primary Examiner* — Yaritza Guadalupe-McCall
(74) *Attorney, Agent, or Firm* — Burr & Forman LLP

(57) ABSTRACT

A measuring tape device may include a housing having an aperture, a reel assembly, a blade, and a piezoelectric bimorph layer. The reel assembly may be enclosed within the housing, and may be configured to alternately allow the blade to be withdrawn from the reel assembly through the aperture or received in the aperture onto the reel assembly. The blade may have a first end configured to extend from the housing through the aperture and a second end configured to be wound on the reel assembly. The piezoelectric bimorph layer may be disposed over at least a portion of the blade.

20 Claims, 5 Drawing Sheets

(56) References Cited

U.S. PATENT DOCUMENTS

| | | | |
|---|---|---|---|
| 11,236,983 B2* | 2/2022 | Patrangenaru | G01B 3/1003 |
| 2005/0252020 A1* | 11/2005 | Critelli | G01B 3/1004 |
| | | | 33/755 |
| 2013/0067759 A1 | 3/2013 | Murray et al. | |
| 2015/0040416 A1 | 2/2015 | Bridges et al. | |
| 2015/0247716 A1 | 9/2015 | Craig et al. | |
| 2017/0176159 A1* | 6/2017 | Moreau | G01B 3/1003 |
| 2018/0195847 A1* | 7/2018 | Khangar | G01B 1/00 |
| 2019/0063893 A1 | 2/2019 | Vitas et al. | |
| 2019/0277612 A1* | 9/2019 | Khangar | G01B 3/1003 |
| 2021/0131780 A1* | 5/2021 | Patrangenaru | G01B 3/1003 |

* cited by examiner

MEASURING TAPE WITH IMPROVED ROLL-OVER PREVENTION AND STANDOUT

TECHNICAL FIELD

Example embodiments generally relate to measuring tape devices, and particularly relate to a measuring tape that has a blade designed to reduce the incidence of roll-over responsive to blade extension and/or improve blade standout.

BACKGROUND

Measuring tapes have been around for a very long time, and are common measuring tools used in numerous contexts to obtain linear measurements. Measuring tapes can come in many forms and may be made of cloth, fiber glass, metal, plastic, or the like. The materials used are often dictated by the specific measuring application. For example, tailors and dressmakers typically use a flexible tape that can be easily manipulated between two hands to measure a distance therebetween. However, for construction or carpentry applications, a stiff and often metallic tape is preferred to allow the measuring tape to be extended between a first location at which one end of the tape is anchored, and the location of the user at whose location the measuring tape is paid out from a reel assembly. The reel assembly may have a manual retracting mechanism or a self-retracting mechanism, typically depending upon the length of the measuring tape. For measuring tapes having length in a range of about 12 ft to 50 ft, self-retracting mechanisms and using metallic tape ribbons for the tape (or blade) are very common.

For nearly a century, metallic tape ribbons with a curved (or cupped) and relatively stiff construction have been preferred for use in self-retracting measuring tapes. The metallic tape ribbon tends to be flexible enough to permit the metallic tape ribbon to be wound onto a spring loaded reel assembly, but stiff enough to have a relatively long standout. The cupping of the metallic tape ribbon further enhances the standout without negatively impacting the ability of the metallic tape ribbon to be wound onto the reel assembly. By employing the end hook at one end of the tape, the user may take advantage of the standout to pay out the measuring tape toward an anchor point on a medium that is to be measured and then conduct the measurement without having to physically move to the anchor point to affix the end hook and then move away to make the measurement. Given the time and energy that can be saved by this method of measurement, taking advantage of the standout characteristics of a self-retracting measuring tape is a very popular feature. So much so, in fact, that it is not uncommon to see a user make multiple attempts to utilize standout and catch a remote end of media being measured with the end hook, rather than simply moving to the remote end of the media to manually fix the end hook to the remote end. When the standout is poor, and the user has to use multiple attempts, or fails and must resort to moving to the remote end to affix the end hook, frustration may grow, and the user may seek out a measuring tape with better standout characteristics.

Invariably, each measuring tape will have a certain length that effectively defines the maximum standout that can be achieved before the tape bends and basically collapses. The measuring tape can no longer be extended reliably toward the anchor point once this collapse occurs. However, the collapse that occurs at maximum standout is not the only type of tape bending or collapse that can occur with metallic tape ribbons. In this regard, another collapse phenomena that can occur is called rollover. Rollover occurs when the blade is rotated about the longitudinal axis of the blade. The rotation of the blade about the longitudinal axis may be desirable when measuring vertical surfaces (e.g., walls, doors, windows, siding, etc.).

For maximum standout, the blade is extended with the apex of the convex side of the cupped shape pointing straight toward the ground. As the blade is rotated about the longitudinal axis and extended, even typical blades that are designed or long standout will tend to collapse when the angle of rotation nears 90 degrees at around three or four feet of extension. Meanwhile, standout characteristics of some blades may enable extension of greater than 10 feet or 12 feet. Thus, it may be desirable to improve anti-rollover characteristics to decrease the gap between the maximum standout and the length at which rollover occurs.

BRIEF SUMMARY OF SOME EXAMPLES

Some example embodiments may enable the provision of a measuring tape that has improved standout and/or anti-rollover characteristics by employing bimorph piezo materials.

In an example embodiment, a measuring tape device may be provided. The measuring tape device may include a housing having an aperture, a reel assembly, a blade, and a piezoelectric bimorph layer. The reel assembly may be enclosed within the housing, and may be configured to alternately allow the blade to be withdrawn from the reel assembly through the aperture or received in the aperture onto the reel assembly. The blade may have a first end configured to extend from the housing through the aperture and a second end configured to be wound on the reel assembly. The piezoelectric bimorph layer may be disposed over at least a portion of the blade.

In another example embodiment, a measuring assembly for a measuring tape device may be provided. The assembly may include a blade and a piezoelectric bimorph layer. The blade may include a first end configured to extend from an aperture in a housing of the measuring tape device and a second end configured to be wound on a reel assembly of the measuring tape device. The piezoelectric bimorph layer may be disposed over at least a portion of the blade, and may be configured to bend responsive to application of an electric potential to the piezoelectric bimorph layer.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

DETAILED DESCRIPTION

Figure 1:
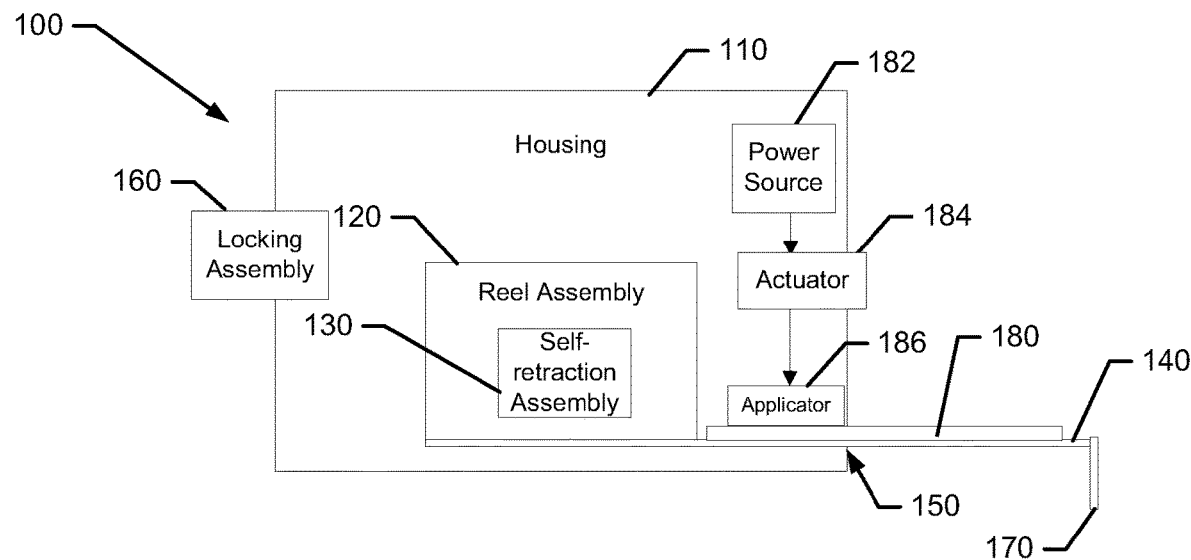
FIG. 1 illustrates a block diagram of the measuring tape device in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As indicated above, some example embodiments may relate to the provision of a measuring tape device that may have an improved blade design for resistance to rollover and/or improved standout. This may be accomplished by providing a piezoelectric bimorph layer to the tape, and further providing an actuator for applying an electric current to the piezoelectric bimorph layer selectively. The orientation of the piezoelectric bimorph layer (or layers) may be selected to enhance desired properties for the tape, and may only be activated when the actuator has been operated.

FIG. 1 illustrates a block diagram of a measuring tape device that may employ a piezoelectric bimorph layer in accordance with an example embodiment. As shown in FIG. 1, a measuring tape device 100 of an example embodiment may include a housing 110. The housing 110 may retain a reel assembly 120 and a self-retraction assembly 130 therein. A blade 140 (or tape) portion of the device 100 may be wound onto the reel assembly 120. The blade 140 may be paid out through an aperture 150 formed in the housing 110. A locking assembly 160 may be provided to enable the reel assembly 120 to be locked to prevent the self-retraction assembly 130 from retracting the blade 140 when the locking assembly 160 is engaged.

The blade 140 may include an end hook 170 disposed at one end thereof, and the blade 140 may be affixed to the reel assembly 120 at the other end thereof. The end hook 170 may be affixed (temporarily) to an anchor point on a medium that is to be measured. Once the end hook 170 is affixed to the anchor point, the blade 140 may be paid out of the aperture 150 and unwound from the reel assembly 120. When a desired length of the blade 140 has been paid out, the user can make any necessary markings, readings, etc., associated with measuring scale markings that may be printed on the blade 140. The measuring scale markings generally measure length from the end hook 170 in one or more units, with divisions and subdivisions of such units clearly marked on the blade 140.

By fixing the end hook 170 to the anchor point, the self-retraction assembly 130 (which may be spring loaded in some cases) may be prevented from retracting the paid out portions of the blade 140 into the housing 110 (via the aperture 150). Similarly, when the locking assembly 160 is engaged, a force (e.g., a pinching force) may be placed on the blade 140 to prevent retraction or motion of the reel assembly 120 may otherwise be inhibited to prevent the self-retraction assembly 130 from retracting the paid out portions of the blade 140. However, when the end hook 170 is not anchored and the locking assembly 160 is not engaged, the self-retraction assembly 130 may cause the reel assembly 120 to wind the blade 140 back onto the reel assembly 120.

As mentioned above, for a typical measuring tape, when the blade 140 is paid out through the aperture 150, the blade 140 will extend relatively straight out the aperture 150 (although some sagging or droop may be noticed due to the weight of the blade 140). The blade 140 can be extended in a guided fashion toward an intended target anchor point while the blade 140 continues to have sufficient rigidity to standout. The blade 140 will continue to extend and standout until the weight of the blade 140 extended past the aperture 150 is sufficient to cause the blade 140 to collapse and bend, thereby losing its rigidity and preventing any further guided extension. The loss of sufficient rigidity which causes collapse and bending of the blade 140 at a length of maximum standout generally occurs at a portion of the blade 140 that can be referred to as a "critical region" since it can occur at slightly different points (but generally in the same region) on different extension operations, and on different individual measuring tapes.

Figure 2A:
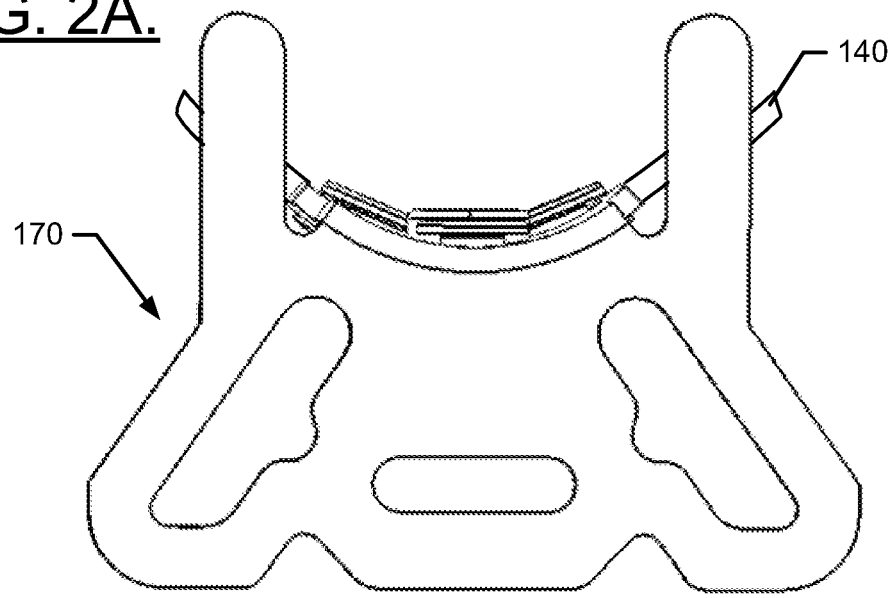
FIG. 2A illustrates a front view of the blade in a normal orientation.
Figure 2B:
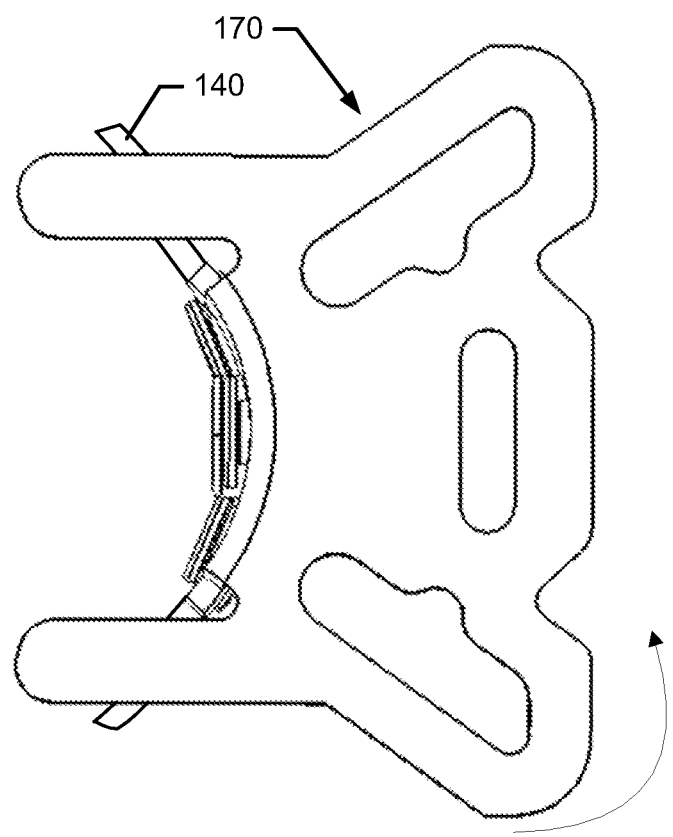
FIG. 2B illustrates the blade rotated about ninety degrees about a longitudinal axis of the blade.

It may be possible to increase the standout capabilities of the blade 140 by changing certain characteristics of the blade 140. For example, the cupping of the blade 140 such that a convex curve having an apex that is generally faced toward the ground when the blade 140 is extended to achieve maximum standout is well known to improve standout of the blade 140. This is the orientation shown in FIG. 2A. However, the blade 140 is not always paid out in this orientation. To the contrary, in some cases, measurement of vertical surfaces or structures may call for paying the blade 140 out of the housing 110 at an angled orientation (e.g., rotated about the longitudinal axis of the blade 140 as much as by 90 degrees, and generally at greater than 60 degrees). FIG. 2B shows the blade 140 and end hook 170 rotated by 90 degrees so that the apex of the convex side of the cupped blade is now rotated 90 degrees and to the viewer's right. For a typical blade that is constructed to have improved standout, a collapse or bending phenomenon referred to as rollover (which is similar to that which occurs at maximum standout in terms of the collapse or bending of the blade 140 that occurs) can occur at a corresponding critical region for rollover. The critical region for rollover for many cupped blades tends to occur at between three to four feet of extension out of the housing 110.

This critical region for rollover and/or the critical region for standout can be treated by modifying various properties of the blade 140 in order to improve standout and rollover resistance. In this regard, for example, by adding a piezoelectric bimorph layer 180, and selectively applying an electric potential thereto, the blade 140 may be selectively reinforced by the operation of the piezoelectric bimorph layer 180 when an electric potential is applied to the piezoelectric bimorph layer. Accordingly, the measuring tape 100 may further be provided with a power source 182 (e.g., a low voltage power supply such as a battery) and an actuator 184 that can be selectively operated by the operator. When the actuator 184 is operated or actuated, power from the power source 182 may be applied to the piezoelectric bimorph layer 180. In some cases, an applicator 186 may be provided to interface with the piezoelectric bimorph layer 180 to apply an electric potential thereto when the actuator 184 is actuated. The applicator 186 may therefore include an electrical brush assembly or any other suitable means by which to apply power to the piezoelectric bimorph layer 180, while still allowing the piezoelectric bimorph layer 180 to freely move with respect to the applicator 186 (e.g., responsive to being paid out of the aperture 150).

The bimorph layer 180 in FIG. 1 is shown to be applied over only a portion of the length of the blade 140. In this regard, for example, the bimorph layer 180 may be applied over the first ten feet of the blade 140 (i.e., from the end hook 170 inwardly for ten feet), or some other distance that covers the "critical region" for rollover and/or standout. Thus, the bimorph layer 180 also need not necessarily extend all the way to the end hook 170. Instead, the bimorph layer 180 may be applied to a portion of the blade 140 that is spaced apart from each opposing end of the blade 140. However, it is also possible to apply the bimorph layer 180 over the entire length of the blade 140, and the length of the spacing from the ends of the blade 140 may not be equal if such spacing is employed. In this regard, for example, the bimorph layer 180 may be provided closer to the end hook 170 than the other end of the blade 140 (particularly for longer blades).

Although the piezoelectric bimorph layer 180 of FIG. 1 is disposed at a top portion of the blade 140, the piezoelectric bimorph layer 180 could alternatively be at a bottom portion of the blade 140. Moreover, in some cases, the blade 140 may include multiple layers of materials, and the piezoelectric bimorph layer 180 could simply be one of the layers. In this regard, the piezoelectric bimorph layer 180 could also be an internal layer among the layers of the blade 140.

Figure 3A:
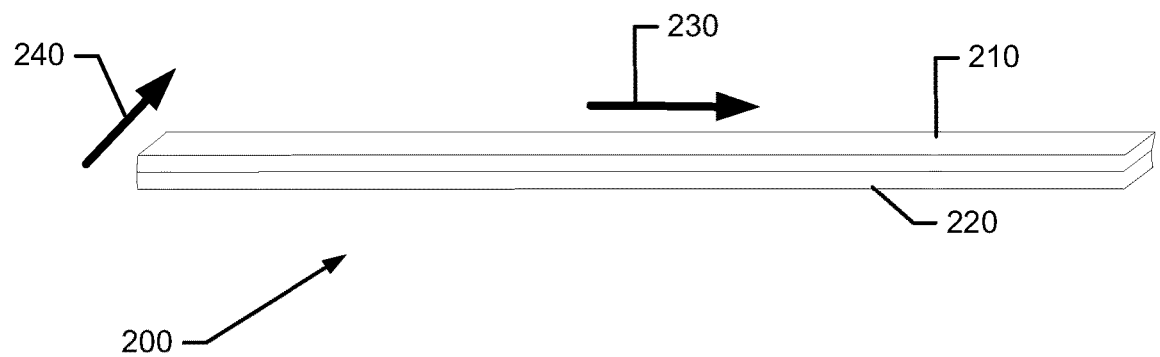
FIG. 3A illustrates a bimorph bender without any electric potential applied thereto in accordance with an example embodiment.
Figure 3B:
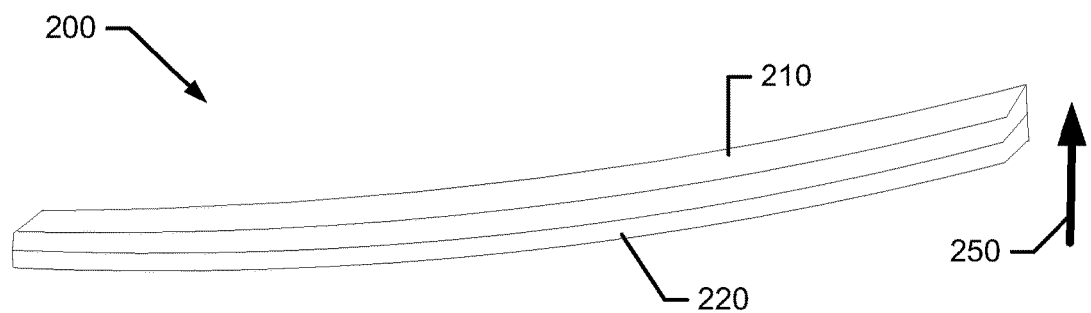
FIG. 3B illustrates the bimorph bender after an electric potential is applied in accordance with an example embodiment.

The piezoelectric bimorph layer 180 may be embodied as a bimorph bender that is operably coupled to the blade 140. FIG. 3A illustrates an example of a bimorph bender 200 prior to application of an electric potential thereto, and FIG. 3B illustrates the bimorph bender 200 after such potential is applied. The operation and construction of piezoelectric materials is well known in the art. However, in general terms it should be understood that piezoelectric materials include a plurality of individual cells that undergo dimensional changes when an electric potential is applied thereto. These dimensional changes can therefore be advantageously employed to define a common orientation for a layer of such material, and then get a response according to the orientation, which can result in predictable movements of the material.

For the bimorph bender 200, a first layer 210 and a second layer 220 may be employed. The first layer 210 configured to contract when a voltage is applied, and the second layer 220 may be configured to expand when a voltage is applied. Accordingly, the combined effect is a bending along the length of the bimorph bender 200. In this regard, FIG. 3A shows the first and second layers 210 and 220 extended in one direction to define a longitudinal axis 230. The first and second layers 210 and 220 are generally planar in FIG. 3A, and merely extend (flat) in the longitudinal direction (i.e., along the longitudinal axis 230). The first and second layers 210 and 220 each have a relatively smaller transverse width (i.e., in transverse direction 240) in this example. However, the extent of the dimensions of the bimorph bender 200 could be altered in any desirable way. For example, the bimorph bender 200 could instead be relatively short in the longitudinal direction, and could be longer in the transverse direction. The bimorph bender 200 need not also be rectangular in overall shape, and could take other shapes as well.

When a potential is applied to the first and second layers 210 and 220, as shown in FIG. 3B, the corresponding contractions and expansions of the first and second layers 210 and 220, respectively, cause the bimorph bender 200 to bend in the vertical direction 250 (i.e., a direction substantially perpendicular to both the longitudinal axis 230 and the transverse direction 240). Accordingly, it can be appreciated that to the extent the bimorph bender 200 of FIGS. 3A and 3B is attached to the blade 140 of FIG. 1 as the piezoelectric bimorph layer 180 such that the longitudinal axis 230 is aligned with the direction of extension of the blade 140, any droop in the blade 140 as the blade 140 stands out would be counteracted by the bending of the bimorph bender 200 (in the opposite direction). The action of the piezoelectric bimorph layer 180 may therefore potentially extend the standout capability of the blade 140. In this regard, the bimorph bender 200 (when employed as the piezoelectric bimorph layer 180) may provide additional rigidity or stiffness resisting droop and potential collapse of the blade 140 during extension in the critical region.

Similarly, it can be appreciated that the bimorph bender 200 (or various adjacent segments thereof) may be arrayed at other orientations (and locations) along the blade 140 to tend to provide more or less curvature for the blade 140 responsive to the application of potential to the piezoelectric bimorph layer 180. For example, segments of the bimorph bender 200 may be oriented to extend such that the transverse direction of the bimorph bender 200 corresponds to the direction of extension of the blade 140. As yet another alternative, multiple segments of the bimorph bender 200 may be used as the piezoelectric bimorph layer 180 with the longitudinal axis 230 and transverse direction 240 of the bimorph bender 200 being arranged at an angle (other than 0 or 90 degrees) relative to the direction of extension of the blade 140. Moreover, the piezoelectric bimorph layer 180 could be placed at a number of strategic locations on the blade 140. Some examples are shown in FIG. 4, which is defined by FIGS. 4A, 4B and 4C.

Figure 4A:
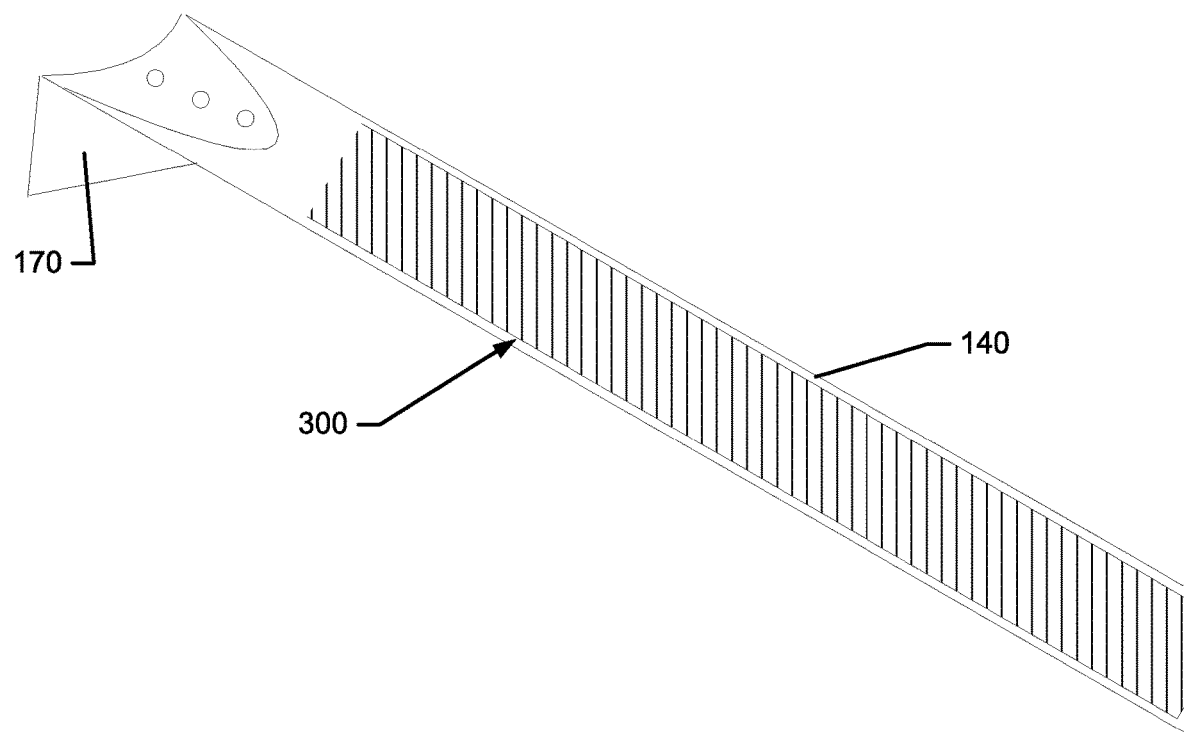
FIG. 4A illustrates a perspective view of the blade with a piezoelectric bimorph layer over a majority of a width of the blade in accordance with an example embodiment.

In this regard, FIG. 4A shows an example in which a piezoelectric bimorph layer 300 is extended nearly entirely transversely across the width of the blade 140. It should be appreciated that the piezoelectric bimorph layer 300 could alternatively extend entirely transversely across the width of the blade 140. Moreover, the blade 140 could be flat, cupped, or combinations of flat and curved portions. For example, the blade 140 could be flat where the piezoelectric bimorph layer 300 is provided, and curved or bent at an angle at other portions thereof. In the example of FIG. 4A, the orientation of the piezoelectric bimorph layer 300 could either be aligned with the longitudinal length of the blade 140 (e.g., so that the piezoelectric bimorph layer 300 tends to bend along the longitudinal length of the blade 140 when an electric potential is applied thereto) or at an angle to the longitudinal length of the blade 140 (e.g., so that the piezoelectric bimorph layer 300 tends to bend about the longitudinal length of the blade 140 when an electric potential is applied thereto).

Figure 4B:
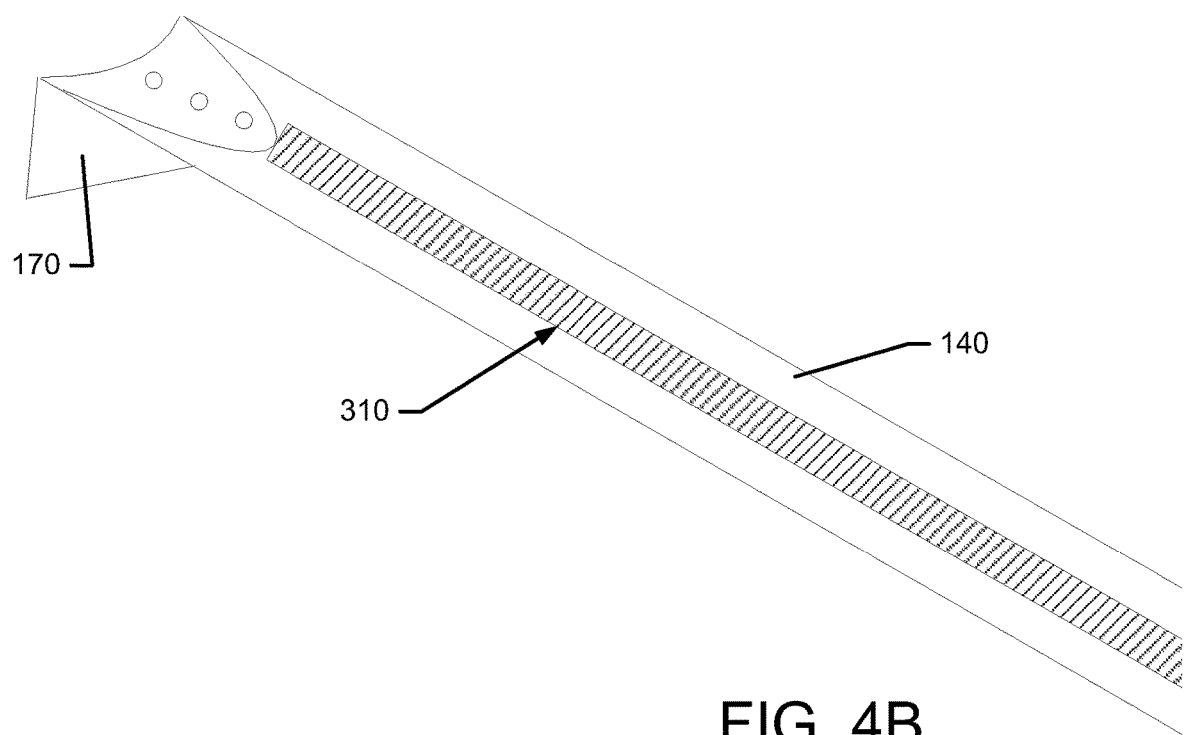
FIG. 4B illustrates a perspective view of the blade with a piezoelectric bimorph layer over only an area proximate to a longitudinal centerline of the blade in accordance with an example embodiment.

FIG. 4B shows an example in which a piezoelectric bimorph layer 310 is extended only along a middle portion of the transverse width of the blade 140, and extends along the longitudinal centerline of the blade 140. Again, the blade 140 could be flat, cupped, or combinations of flat and curved portions. For example, the blade 140 could be flat where the piezoelectric bimorph layer 310 is provided, and curved or bent at an angle at other portions thereof. However, the blade 140 could also be cupped where the piezoelectric bimorph layer 310 is provided. In the example of FIG. 4B, the orientation of the piezoelectric bimorph layer 310 may be aligned with the longitudinal length of the blade 140 (e.g., so that the piezoelectric bimorph layer 300 tends to bend along the longitudinal length of the blade 140 when an electric potential is applied thereto).

Figure 4C:
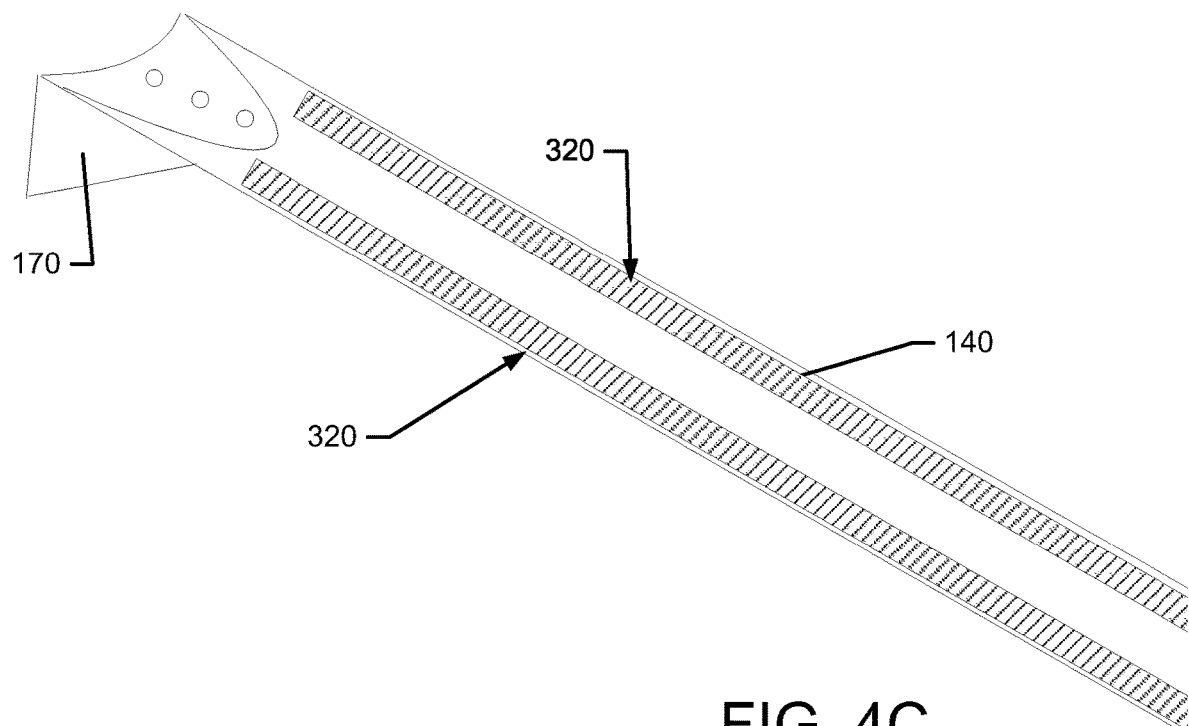
FIG. 4C illustrates a perspective view of the blade with two instances of a piezoelectric bimorph layer applied to outside edges of the blade in accordance with an example embodiment.

FIG. 4C shows another example in which two instances of a piezoelectric bimorph layer 320 are extended only along outer portions of the transverse width of the blade 140. Again, the blade 140 could be flat, cupped, or combinations of flat and curved portions. For example, the blade 140 could be flat where the piezoelectric bimorph layer 320 is provided, and curved or bent at an angle at other portions thereof. However, the blade 140 could also be cupped or slightly bent where the piezoelectric bimorph layer 320 is provided. In the example of FIG. 4C, the orientation of the piezoelectric bimorph layer 320 may be aligned with the longitudinal length of the blade 140 (e.g., so that the piezoelectric bimorph layer 300 tends to bend along the longitudinal length of the blade 140 when an electric potential is applied thereto).

In an example embodiment, a measuring tape device may be provided. The measuring tape device may include a housing having an aperture, a reel assembly, a blade, and a piezoelectric bimorph layer. The reel assembly may be enclosed within the housing, and may be configured to alternately allow the blade to be withdrawn from the reel assembly through the aperture or received in the aperture onto the reel assembly. The blade may have a first end configured to extend from the housing through the aperture and a second end configured to be wound on the reel assembly. The piezoelectric bimorph layer may be disposed over at least a portion of the blade.

In some embodiments, the features of the device described above may be augmented or modified, or additional features may be added. These augmentations, modifications and additions may be optional and may be provided in any combination. Thus, although some example modifications, augmentations and additions are listed below, it should be appreciated that any of the modifications, augmentations and additions could be implemented individually or in combination with one or more, or even all of the other modifications, augmentations and additions that are listed. As such, for example, the device may further include a power source provided at a portion of the housing, and an actuator configured to apply an electric potential to the piezoelectric bimorph layer responsive to actuation of the actuator. In an example embodiment, the power source may be a battery. In some cases, the device may further include an applicator operably coupled to the power source and slidingly operably coupled to the piezoelectric bimorph layer to enable application of the electric potential to the piezoelectric bimorph layer responsive to actuation of the actuator. In an example embodiment, the piezoelectric bimorph layer may be disposed along a longitudinal centerline of the portion of the blade. In some cases, the piezoelectric bimorph layer may extend transversely over substantially all of a width of the blade along the portion of the blade, and the piezoelectric bimorph layer may be oriented to bend along the longitudinal centerline of the blade when the electric potential is applied to the piezoelectric bimorph layer. Alternatively, the piezoelectric bimorph layer may be oriented to bend about the longitudinal centerline of the blade when the electric potential is applied to the piezoelectric bimorph layer. In an example embodiment, the piezoelectric bimorph layer may be spaced apart from edges of the blade along the portion of the blade, and the piezoelectric bimorph layer may be oriented to bend along the longitudinal centerline of the blade when the electric potential is applied to the piezoelectric bimorph layer. In some cases, there may be two instances of the piezoelectric bimorph layer disposed on the blade, and each of the two instances may be proximate to a respective one of opposing lateral edges of the blade along the portion of the blade. The piezoelectric bimorph layer may be oriented to bend along the longitudinal centerline of the blade when the electric potential is applied to the two instances of the piezoelectric bimorph layer. In an example embodiment, the blade may be flat or cupped, and the piezoelectric bimorph layer could be disposed along a top or bottom portion of the blade, or may be an internal layer of the blade.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A measuring tape device comprising:
    a housing having an aperture;
    a reel assembly enclosed within the housing, the reel assembly being configured to alternately allow the blade to be withdrawn from the reel assembly through the aperture or received in the aperture onto the reel assembly;
    a blade having a first end configured to extend from the housing through the aperture and a second end configured to be wound on the reel assembly; and
    a piezoelectric bimorph layer disposed over at least a portion of the blade.

2. The device of claim 1, further comprising:
    a power source provided at a portion of the housing; and
    an actuator configured to apply an electric potential to the piezoelectric bimorph layer responsive to actuation of the actuator.

3. The device of claim 2, wherein the power source comprises a battery.

4. The device of claim 2, further comprising an applicator operably coupled to the power source and slidingly operably coupled to the piezoelectric bimorph layer to enable application of the electric potential to the piezoelectric bimorph layer responsive to actuation of the actuator.

5. The device of claim 2, wherein the piezoelectric bimorph layer is disposed along a longitudinal centerline of the portion of the blade.

6. The device of claim 5, wherein the piezoelectric bimorph layer extends transversely over substantially all of a width of the blade along the portion of the blade, and
wherein the piezoelectric bimorph layer is oriented to bend along the longitudinal centerline of the blade when the electric potential is applied to the piezoelectric bimorph layer.

7. The device of claim 5, wherein the piezoelectric bimorph layer extends transversely over substantially all of a width of the blade along the portion of the blade, and
wherein the piezoelectric bimorph layer is oriented to bend about the longitudinal centerline of the blade when the electric potential is applied to the piezoelectric bimorph layer.

8. The device of claim 5, wherein the piezoelectric bimorph layer is spaced apart from edges of the blade along the portion of the blade, and
wherein the piezoelectric bimorph layer is oriented to bend along the longitudinal centerline of the blade when the electric potential is applied to the piezoelectric bimorph layer.

9. The device of claim 2, wherein two instances of the piezoelectric bimorph layer are disposed on the blade, and
wherein each of the two instances is proximate to a respective one of opposing lateral edges of the blade along the portion of the blade, and
wherein the piezoelectric bimorph layer is oriented to bend along the longitudinal centerline of the blade when the electric potential is applied to the two instances of the piezoelectric bimorph layer.

10. The device of claim 2, wherein the blade is flat.

11. The device of claim 2, wherein the blade is cupped.

12. The device of claim 2, wherein the piezoelectric bimorph layer is disposed along a top portion of the blade.

13. The device of claim 2, wherein the piezoelectric bimorph layer is disposed along a bottom portion of the blade.

14. The device of claim 2, wherein the piezoelectric bimorph layer is an internal layer of the blade.

15. A measuring assembly for a measuring tape device, the assembly comprising:

a blade having a first end configured to extend from an aperture in a housing of the measuring tape device and a second end configured to be wound on a reel assembly of the measuring tape device; and a piezoelectric bimorph layer disposed over at least a portion of the blade, the piezoelectric bimorph layer being configured to bend responsive to application of an electric potential to the piezoelectric bimorph layer.

16. The measuring assembly of claim 15, wherein the piezoelectric bimorph layer is disposed along a longitudinal centerline of the portion of the blade.

17. The measuring assembly of claim 16, wherein the piezoelectric bimorph layer extends transversely over substantially all of a width of the blade along the portion of the blade, and
wherein the piezoelectric bimorph layer is oriented to bend along the longitudinal centerline of the blade when the electric potential is applied to the piezoelectric bimorph layer.

18. The measuring assembly of claim 16, wherein the piezoelectric bimorph layer extends transversely over substantially all of a width of the blade along the portion of the blade, and
wherein the piezoelectric bimorph layer is oriented to bend about the longitudinal centerline of the blade when the electric potential is applied to the piezoelectric bimorph layer.

19. The measuring assembly of claim 16, wherein the piezoelectric bimorph layer is spaced apart from edges of the blade along the portion of the blade, and
wherein the piezoelectric bimorph layer is oriented to bend along the longitudinal centerline of the blade when the electric potential is applied to the piezoelectric bimorph layer.

20. The measuring assembly of claim 15, wherein two instances of the piezoelectric bimorph layer are disposed on the blade, and
wherein each of the two instances is proximate to a respective one of opposing lateral edges of the blade along the portion of the blade, and
wherein the piezoelectric bimorph layer is oriented to bend along the longitudinal centerline of the blade when the electric potential is applied to the two instances of the piezoelectric bimorph layer.

\* \* \* \* \*